Figure 6:
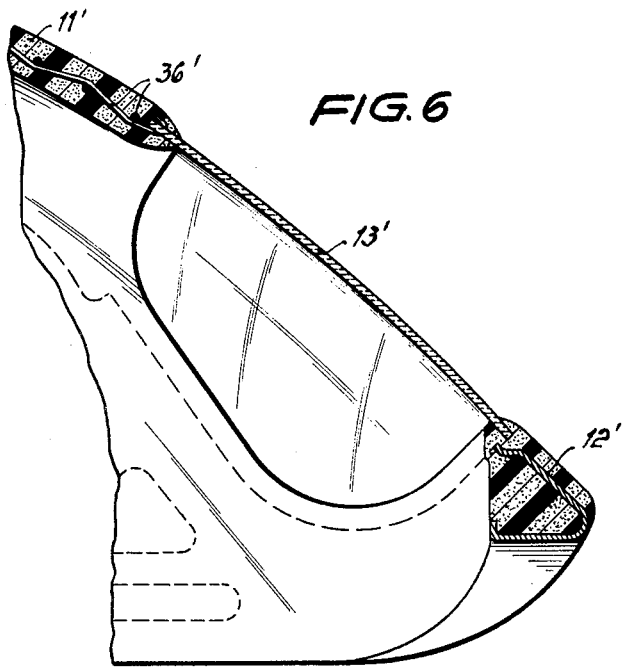

Dec. 11, 1962 E. KOMENDA 3,068,043
VEHICLE BODY OF METAL REINFORCED SYNTHETIC RESIN
Filed Nov. 25, 1960 6 Sheets-Sheet 1
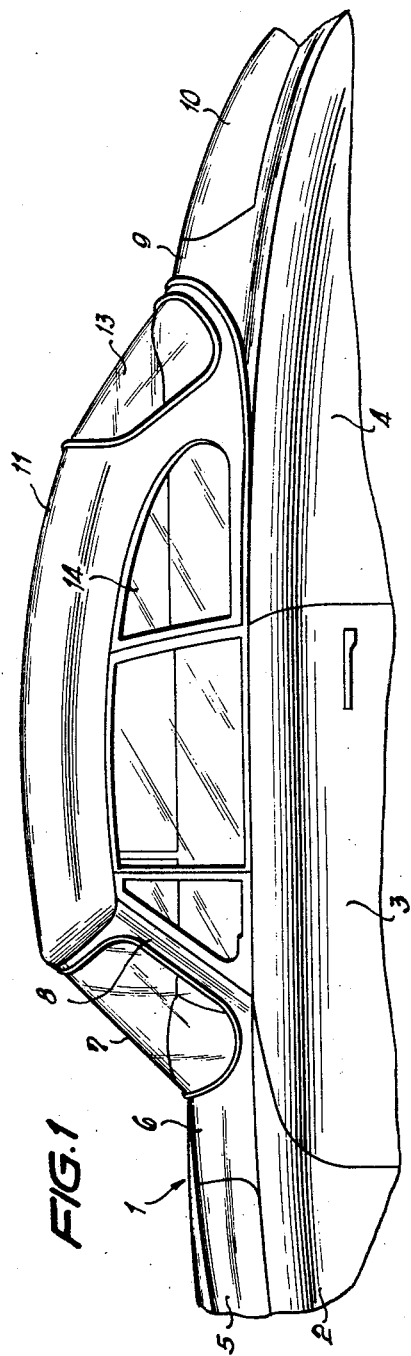
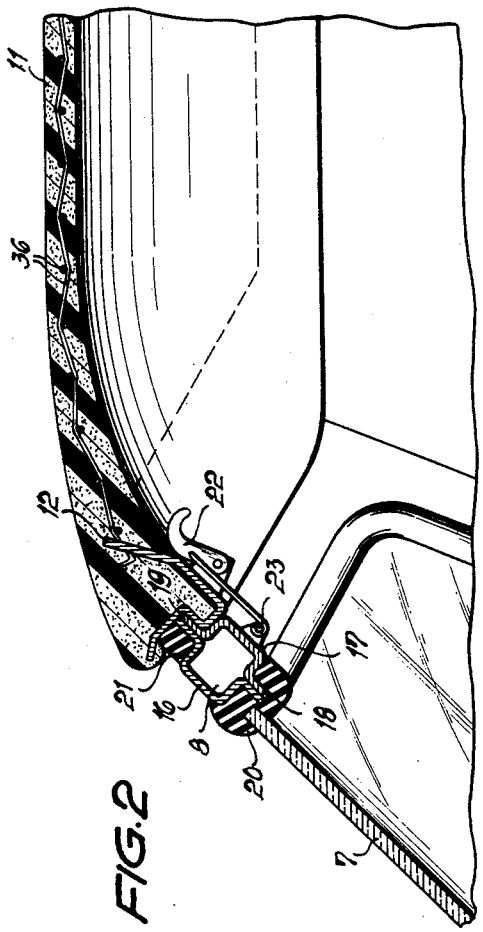
INVENTOR
Erwin KOMENDA
BY Dicke, Craig & Freudenberg
ATTORNEYS

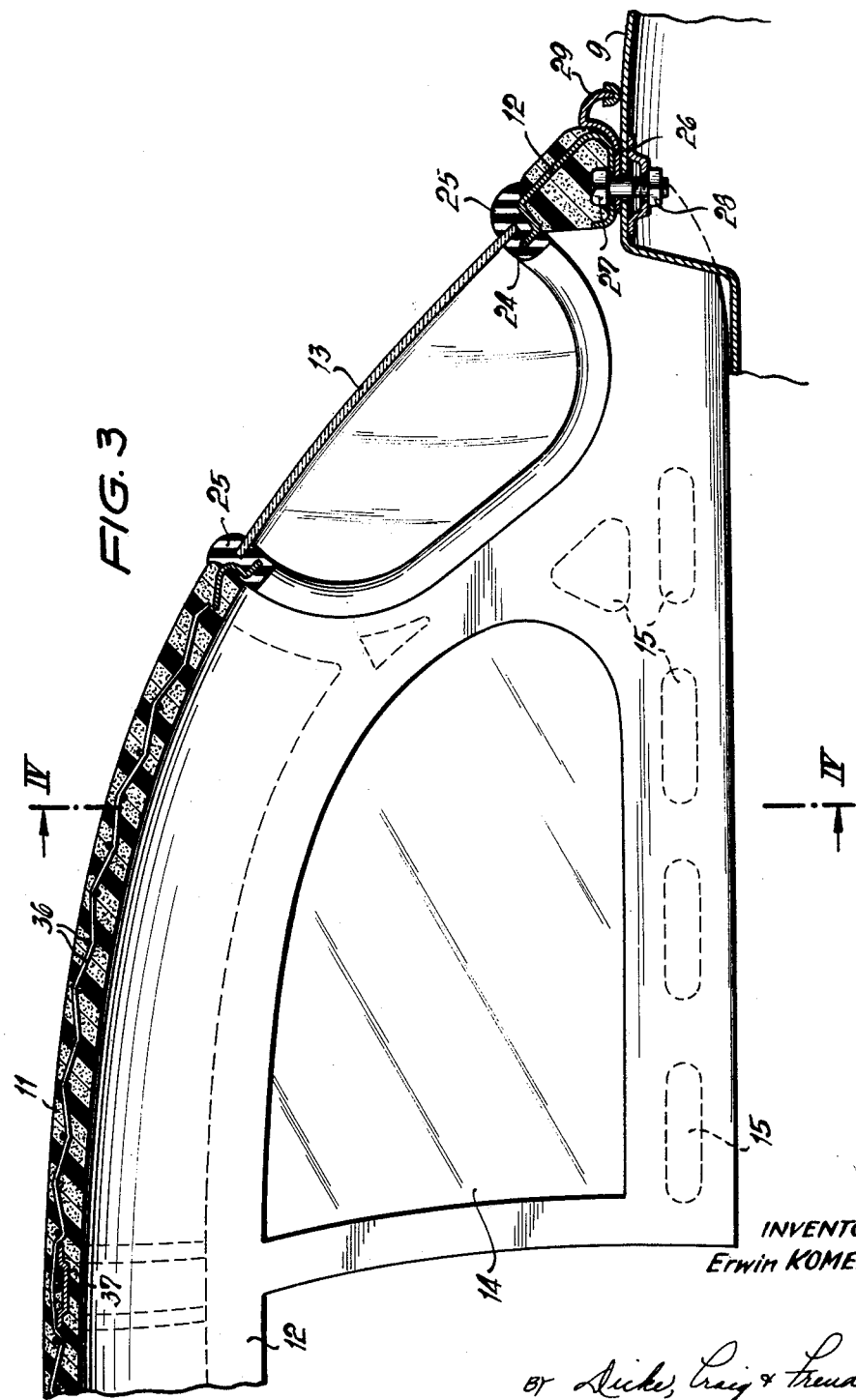

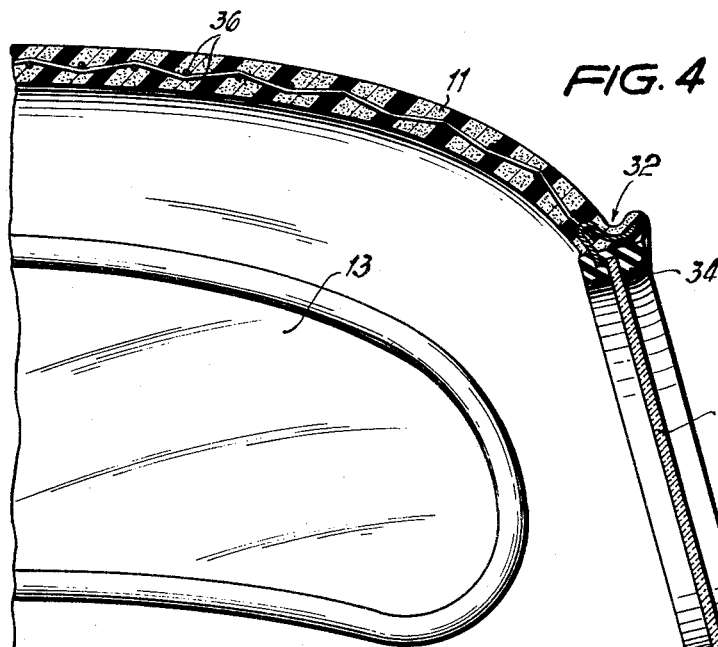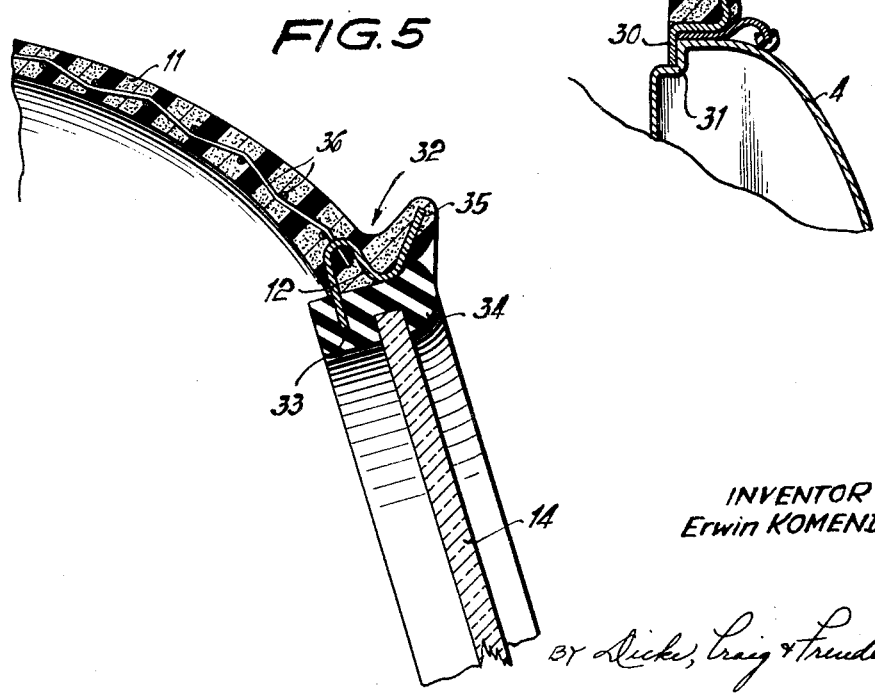

Dec. 11, 1962 E. KOMENDA 3,068,043
VEHICLE BODY OF METAL REINFORCED SYNTHETIC RESIN
Filed Nov. 25, 1960 6 Sheets-Sheet 5
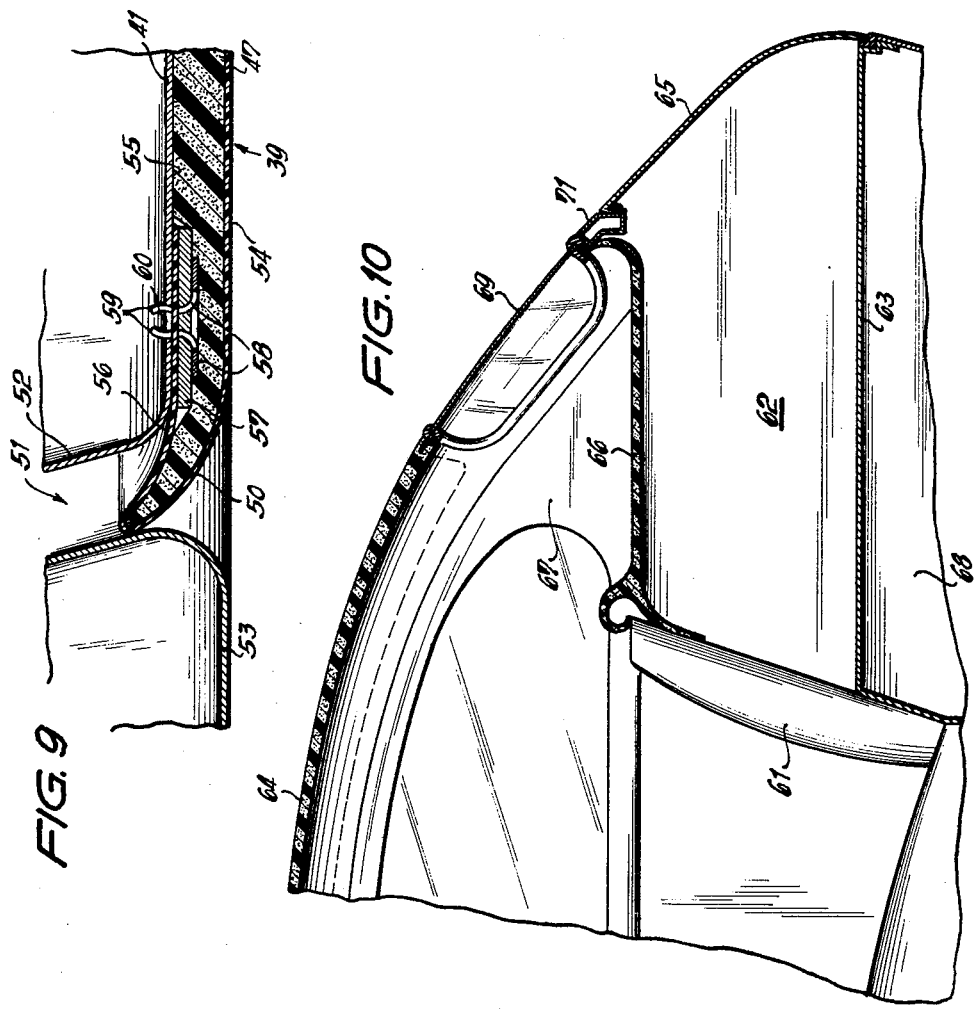
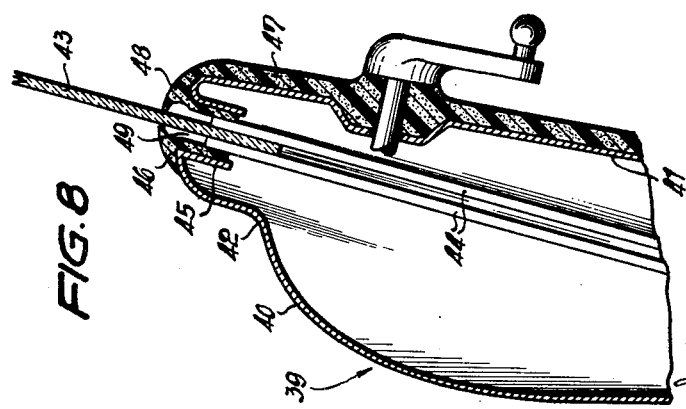
INVENTOR
Erwin KOMENDA
BY
ATTORNEYS

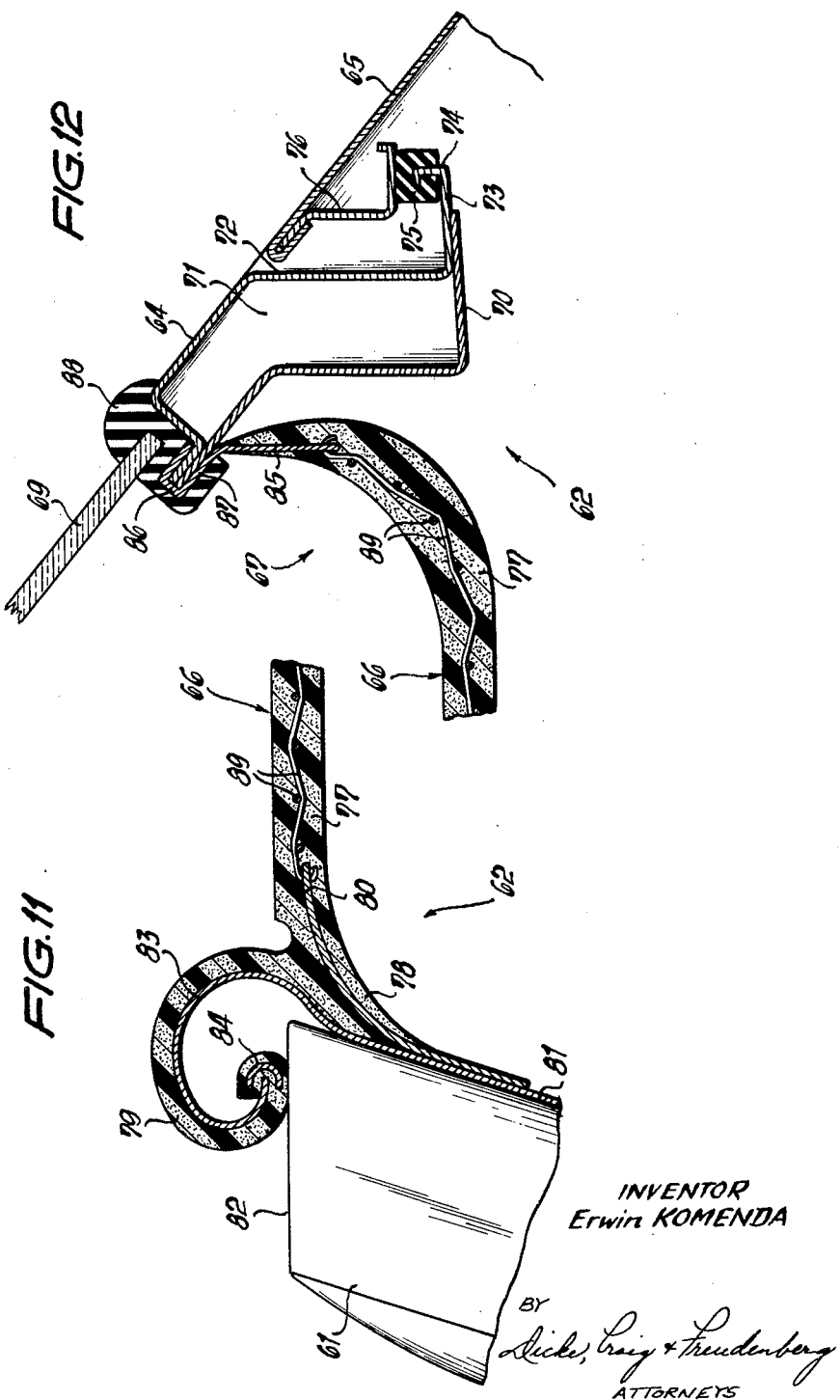

United States Patent Office 3,068,043
Patented Dec. 11, 1962

3,068,043
VEHICLE BODY OF METAL REINFORCED SYNTHETIC RESIN
Erwin Komenda, Stuttgart, Germany, assignor to Firma Dr. Ing. h.c. F. Porsche KG, Stuttgart-Zuffenhausen, Germany
Filed Nov. 25, 1960, Ser. No. 71,509
Claims priority, application Germany Dec. 16, 1959
9 Claims. (Cl. 296—31)

The present invention relates to a vehicle body for motor vehicles, especially passenger motor vehicles.

The vehicle bodies of motor vehicles are manufactured almost exclusively of stamped-out or pressed-out sheet metal parts which result, with a corresponding shape, in a torsion-rigid construction requiring a limited amount of space. Such types of constructions, however, have many disadvantages which can be eliminated only with considerable expenditures. For example, the droning of large continuous pressed parts, such as the pressed part or panel of the roof, can be eliminated only with great difficulties. Similarly, the insulation of the passenger space against heat and noises has not been solved even to date in a satisfactory manner. Additionally, the surface of such structures is hyper-sensitive against impact and scratches whereby corresponding costs arise for the repair thereof. Furthermore, the parts of the vehicle body which possibly are constructed so as to be detachable and may be selectively secured to the body, such as, for example, a hard top are relatively heavy and difficult to handle whereby especially in that case the danger of damage is very great.

A partial elimination of these disadvantages is brought about by the vehicle body made of synthetic resins which possibly may be reinforced by suitable filler material, for instance, by glass fibers. Structures, walls and panels constructed in this manner possess a certain damping characteristic and do not represent good heat conductors so that the transmission of noise and heat is reduced. Walls of such materials, however, are not suited to absorb noise within the space which they enclose.

The aim underlying the present invention essentially consists, departing from the aforementioned recognitions, to realize a construction and/or constitute the vehicle body in such a manner that a shielding of the passenger space against noise and an absorption of the noise prevailing within the space takes place to an extent beyond the known, realizable measure. Especially with vehicles which are to be driven by an air-cooled internal combustion engine, noises are transmitted, for example, by the sheet metal floor, into the passenger space, a phenomenon which can be prevented normally only with great difficulty.

This is achieved in accordance with the present invention by constructing the walls or wall panels of the vehicle body of foamed laminates which are connected each with form-rigid supporting parts. Walls constructed in such a manner not only possess a large absorption capacity but also assure a good heat insulation of the enclosed space. The walls consisting of foamed laminates are of relatively light weight so that, for example, detachable roofs made in this manner may be handled advantageously. The foamed laminate is connected, for purposes of permanency and rigidity in the shape thereof, with supporting parts or members matched or conformed to the contour of the vehicle body or to a part thereof so that, notwithstanding the relatively labile material, the use of which entails numerous advantages, a form-rigidity of the structural part is achieved.

The supporting parts are arranged along the rim of portions of the foamed laminate forming the wall, wall part or body panel and, during manufacture thereof, are therefore at least partly foamed into the same. By reason of the foaming-in of the supporting parts which are constructed, for example, as pressed parts made of sheet metal or of a synthetic material, a relatively large-surface connection is established between the individual parts. This may be advantageously improved by the fact that the supporting members or parts are provided within the foamed-in area thereof with apertures. It is, however, also possible that the supporting members or parts are constructed as additional structural parts and are secured at the wall consisting of a foamed laminate. With relatively large-surface foamed wall panels or parts having arcuate or irregular outer surfaces there is embedded therein a framework, preferably a wide-mesh wire network or wire-mesh. The wire mesh is anchored at the supporting parts whereby the supporting parts serve simultaneously for the fastening of the wall or wall part at the adjacent vehicle body part. It is thereby advantageous if the supporting parts form a frame closed in itself. As a result thereof, there is imparted to the wall such rigidity as is necessary for the absorption of the forces occurring during transportation and assembly.

With a detachable roof of a vehicle body which has the aforementioned features, there is provided, preferably within the area of the door aperture thereof, a girder extending transversely to the vehicle longitudinal axis which is adapted or conformed to the roof curvature and supports the framework which is secured at the frame. The roof is thereby advantageously reinforced by the transverse connection of the frame. Simultaneously therewith, the girder forms a support for the framework. Depending on the construction of the cross-girder as well as on the cross section thereof, the cross-girder possibly also forms a protection against indentation or collapsing of the roof particularly when the vehicle rolls over. With a roof having a rear window, the rim portions of the clear-vision laminate forming, in a manner known per se, the rear window, are foamed together with the roof laminate.

In a vehicle body provided with a door covering, there is further proposed in accordance with the present invention that the covering constructed as a foamed laminate be provided with sealing bodies made integrally or in one piece therewith, for example, seals or the like, for purposes of covering or closing off the gaps extending within the rim areas thereof. The arrangement of a further additional seal together with the necessary fastening means are obviated thereby. The cover forms thereby simultaneously the aperture for a window to be inserted into the door.

Accordingly, it is an object of the present invention to provide a vehicle body construction which eliminates the disadvantages and shortcomings of the prior art constructions as are normally encountered with stamped or pressed sheet metal parts or with body parts made of synthetic resins.

It is still another object of the present invention to provide a vehicle body which effectively eliminates droning, provides an effective insulation of the passenger space against heat and noises, and additionally offers a considerably reduced sensitivity against scratches and impact.

Another object of the present invention resides in the provision of a vehicle body construction in which the individual parts, especially the detachable parts, are of relatively light weight so as to permit easy handling thereof and thereby reducing the danger of damage in case of transportation and installation.

Still a further object of the present invention resides in the provision of a vehicle body construction which reduces the transmission of noises and heat and which has a very small absorption capacity for heat.

A further object of the present invention resides in the provision of a motor vehicle body which may be manufactured relatively inexpensively and which provides a relatively form-rigid structure.

Figure 7:
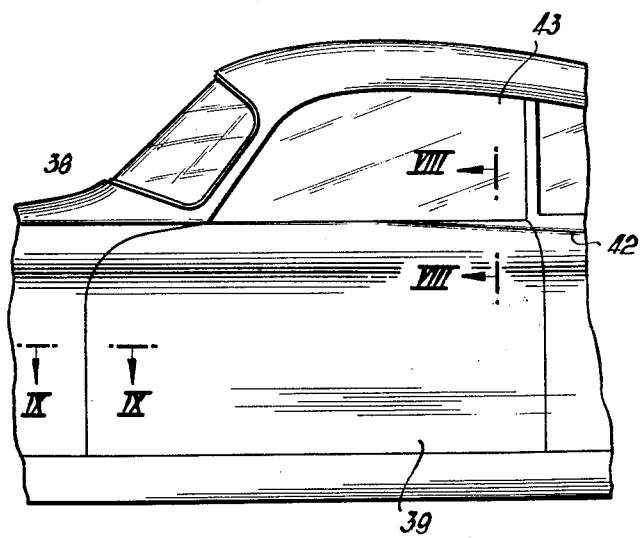

These and other objects, features and advantages of the present invention will become more obvious from the following description when taken in connection with the accompanying drawing which shows, for purposes of illustration only, several embodiments in accordance with the present invention, and wherein:

FIGURE 1 is a partial side-elevational view of a passenger motor vehicle, provided with a detachable roof, in accordance with the present invention, FIGURE 2 is a central longitudinal cross sectional view, on an enlarged scale, through the roof of FIGURE 1 within the area of the windshield, FIGURE 3 is a longitudinal cross sectional view, on an enlarged scale, through the roof of FIGURE 1, within the area of the rear window of the roof, FIGURE 4 is a cross sectional view taken along line IV—IV of FIGURE 3, FIGURE 5 is an enlarged partial cross sectional view illustrating certain details of a roof construction in accordance with the present invention, FIGURE 6 is a longitudinal cross sectional view through a modified embodiment of a passenger motor vehicle having a detachable hard top the cross section being taken within the area of the rear window, FIGURE 7 is a side view of a door of a passenger motor vehicle together with the adjoining parts in accordance with the present invention, FIGURE 8 is a cross sectional, on an enlarged scale, taken along line VIII—VIII of FIGURE 7, FIGURE 9 is a cross sectional view, on an enlarged scale, taken along line IX—IX of FIGURE 7, FIGURE 10 is a partly schematic longitudinal cross sectional view through the rear of still another embodiment of a passenger motor vehicle in accordance with the present invention, FIGURE 11 is a partial cross sectional view, on an enlarged scale, illustrating some details of the embodiment of FIGURE 10, and FIGURE 12 is a partial cross sectional view, on an enlarged scale, illustrating still further details of the embodiment of FIGURE 10.

Referring now to the drawing wherein like reference numerals are used throughout the various views to designate corresponding parts, and more particularly to FIGURE 1, the motor vehicle illustrated therein is provided with a vehicle body the individual parts and wall panels of which are manufactured partly as stamped sheet metal parts and partly of synthetic material. The front wheel covers or fenders 2, the door 3 and the rear wheel covers or fenders 4 consist essentially of stamped or pressed out sheet metal parts. Additionally, consisting essentially of pressed sheet metal parts are, in the front of the vehicle, the hood 5 together with the cowl 6 which is adjoined by a frame 8 accommodating therein the windshield 7. In the rear of the vehicle, the bow member 9 together with adjoining lid 10 are also constructed as pressed sheet metal parts. These parts produce in their aggregate the outer covering body walls of an open vehicle.

It is known in the prior art to provide such a vehicle, constructed as a convertible, with a protective cover made of fabric or pressed sheet metal parts whereby the latter entail a considerably better protection against cold as well as a more pleasing appearance. Since with hard-top roofs, there exist only local connections between the vehicle body and the roof, the tendency to rattle or to vibrate is very great on the part of such roofs. Especially with vehicles which are driven by air-cooled internal combustion engines, this property of the roof is of particular disadvantage.

In order to avoid these disadvantages normally encountered with the prior art constructions, the roof 11 in accordance with the present invention is made of a porous synthetic material in that a laminate is obtained by foaming action. There exist several possibilities for the manufacture of the foamed laminate of which only two will be described hereinafter by a reference to two individual embodiments.

One of the known methods pursuant to which the roof illustrated in FIGURES 2 to 4 is made essentially consists in placing into a mold a thin layer of a mass of synthetic material, preferably consisting of PVC (polyvinyl chloride). After a brief stabilization of this mass by the application of heat, a second layer of this PVC mass is placed over this first layer into the mold, however, mixed this time with a known foaming agent, whereupon the mold is closed and is heated, for example, to 190° C. The individual layers thereby unite closely and form a unitary structure. It is possible not to subject to the foaming action parts of the first thin and porous-free layer of the laminate by covering the same whereby this section can be used, in the finished product, for purposes of fastening or securing thereto or supporting thereon other parts.

The roof 11 according to FIGURES 2 to 4 is provided with a bearer frame 12. The bearer frame 12 which consists either of pressed sheet metal parts or possibly also of synthetic resins extends along the outer rim portions of the roof 11 and simultaneously forms the support for a rear window 13 as well as for a permanently installed side window 14. At least a part of the bearer frame 12 is foamed-in into the roof whereby a good connection between the parts is achieved. This may be enhanced by the fact that apertures or openings 15 are provided in the bearer frame 12 whereby a connection is established in certain sections between the foamed masses extending to both sides of the bearer frame.

The windshield frame 8 is composed of two essentially U-shaped parts 16 and 17 which are connected with each other by means of flanges 18 and 19. The flange 18 serves for purposes of retaining a profile seal 20 within which is supported the windshield 7. The flange 19 forms an abutment for the bearer from 12 which is additionally supported over a seal 21 at the windshield frame 8 or pressed part 16. The securing of the roof 11 at the frame 8 takes place by means of a clamping connection 22 of any suitable construction which is secured at the bearer frame 12 of the roof 11 and engages into a lug 23 secured at the pressed part 17.

The bearer frame 12 also possesses within the area of the rear window 13 (FIGURE 3) a flange 24 in which is anchored a seal 25 receiving therein the window 13. Additionally, the frame 12 is provided with an angularly bent portion 26 extending essentially horizontally with which a threaded bolt member 27 is connected, for example, rigidly. This bolt member 27 may be inserted into an aperture of the bow member 9 of the vehicle body and may be secured by a nut 28. For purposes of covering the gap between the angular bent portion 26 of the bearer frame 12 and the bow member 9 of the body there is provided a decorative strip 29. The fastening of the roof at the body, however, may also take place by any other suitable known means, possibly by the interposition of elastic inserts.

The bearer frame 12 is constructed correspondingly within the area of the side windows 14 (FIGURES 4 and 5) whereby for purposes of fixing the roof to the body the latter is additionally provided with a flange portion 30 which abuts against a stepped offset 31 of the rear wheel cover or fender 4. The roof provided with a rain channel 32 which is formed integrally with the roof, i.e, is made in one piece therewith. The bearer frame 12 is of essentially undulated shape within this area whereby the one rim portion 33 of the bearer frame 12 provides for the retention of a seal 34 for the window 14 and the other rim portion 35 extends beyond the plane of the roof and forms a reinforcement or framework for the rain channel 32.

The roof is additionally provided wtih a framework by means of which the form-rigidity thereof is assured. For that purpose, a wire-mesh or wire-network 36 is embedded in the foamed layer which possesses a curvature corresponding to the contour of the roof. The wire mesh 36 is anchored at the bearer frame 12, and more particularly at the foamed-in part thereof, i.e., at the part thereof connected by foaming action.

For purposes of reinforcing the bearer frame 12, a girder member 37 (FIGURE 3) is arranged within the area of the door 3 which is secured at the bearer frame 12 and extends transversely over the roof. The shape of the girder member 37 is matched to the arching contour of the roof whereby the girder 37 is also preferably embedded in the foamed-in part of the roof. The girder 37 thereby simultaneously supports the wire mesh 36 in an advantageous manner. Dependent on the construction of the girder 37 and/or the dimensions thereof, the girder may provide a protection against indentation or collapse of the roof in case the vehicle turns over.

FIGURE 6 illustrates a roof 11' which, in contradistinction to the embodiment of FIGURE 3 possesses a rear window 13' made of a transparent clear-vision laminate. This clear-vision laminate is directly inserted into the foamed portion of the roof 11' and is connected therewith in this manner. The bearer frame 12' extends correspondingly within the area of the rear window 13' exclusively along the outer rim of the roof and forms a form-rigid reinforcement. The framework or wire-mesh 36' is thereby constructed in such a manner that it overlaps with the rear window pane 13' and forms a support therefor.

FIGURE 7 illustrates a side view of a motor vehicle 38 within the area of the door 39 thereof. As may be seen from FIGURE 8, the door 39 consists of an outer pressed part 40 and of an inner pressed part 41 which are connected with each other within the rim areas of the door 39 in any known suitable manner. The pressed parts 39 and 40 are arranged essentially below the belt line 42 of the vehicle whereby a window pane 43 is provided thereabove which is constructed, in a manner known per se, to be lowerable into the door 39 within a guide means 44. The rim portion 45 of the outer pressed part 40 which is adjacent the window pane 43 is angularly bent and extends essentially parallelly to the pane 43. A seal 46 is secured at the rim 45 in a manner known per se.

The inner pressed part 41 is provided with a wall panel or part 47 constructed in accordance with the present invention which preferably extends over the entire door and forms the inner door covering. The wall part 47 is provided with an essentially plane surface and is conformed along the side thereof facing the inner pressed part 41 to the contour of the latter. The pressed part 41 is angularly bent within the area of the window pane 43 and forms an abutment or support for the door covering 47 which forms thereby the door aperture for the window pane 43. The door covering 47 is further provided with a sealing lip 48 which is made in one piece therewith and which seals the gap 49 between the pane 43 and the covering 47.

The door covering 47 is provided with a further sealing lip 50 (FIGURE 9) which covers the gap 51 between the door fold 52 of the inner pressed part 41 and the fixed part of the body, for example, the forward wheel covering or fender 53. This sealing lip 50 is preferably provided in addition to a door seal of known construction (not illustrated in the drawing) for the purpose to prevent the entrance of the air stream with a poorly abutting main seal and to establish a smooth transition between the parts.

The wall part illustrated in FIGURE 9 is manufactured according to a different method or process from the walls according to FIGURES 2 to 6. In differentiation of the method of manufacture of the foamed wall described hereinabove, a finishel laminate 54 was used as base body which is provided according to the present invention with a foamed layer 55 preferably consisting of a PVC mass under essentially similar conditions as described in connection with the embodiment of FIGURES 2 to 6. The rim portions 56 of the laminate are free and unfoamed and serve for purposes of securing of the covering at the inner pressed part 41 of the door 39. For that purpose, a bearer part 57 is placed upon the foamed part 55 of the covering 47 which is constructed as a flat tape or band and extends preferably over a larger area of the covering. This band 57 is provided with a plurality of clamps 58 of known construction the springy tongue portions of which are inserted into an aperture 60 of the inner pressed part 41. The free rim portion 56 of the laminate 54 is thereby inserted between the band 57 and the pressed part 41 and is retained thereat in position.

The vehicle part illustrated in FIGURE 10 is provided with a rear seat bench 61 which is adjoined by a luggage space 62. The luggage space 62, in addition to being defined or delimited by the seat bench 61, is also limited by the luggage space floor 63 and a lid 65 adjoining the vehicle roof 64. Additionally, an essentially horizontally extending wall 66 is provided between the seating bench 61 and the pressed roof part 64 which separates the passenger space 67 from the luggage space 62. The internal combustion engine driving the vehicle is accommodated, for example, within the space 68 below the luggage floor 63.

A rear window 69 is accommodated within the pressed roof part 64. The roof part 64 is further provided at least within the area adjoining the lid 65 with an additional part 70 by means of which a box-shaped cross bearer 71 is formed. The pressed roof part 64 is further provided with an angularly bent portion 72 which forms the aperture for the reception of the lid or cover 65. This angularly bent portion 72 passes over into an essentially horizontally extending flange 73 the upright rim portion 74 of which carries a seal 75. The lid 65 is connected with a reinforcing part 76 which in the closed condition of the lid 65 rests against the seal 75. A hinge (not illustrated in the drawing) of known construction for purposes of pivotally supporting the lid 65 is arranged between the reinforcing part 76 and the angularly bent portions 72 of the pressed roof part 64.

The separating wall 66 consists in accordance with the present invention of a foamed laminate whereby the foamed layer 77 is covered possibly on both sides with other layers or laminates. The separating wall 66 may be manufactured in accordance with any known method, particularly any one of the two methods described hereinabove. The rim of the wall 66 adjoining the seat bench 61 is split whereby two divergent lip portions 78 and 79 are present. The lip portion 78 is provided with a reinforcement 80 which is constructed as a form part, preferably as a pressed sheet metal part. This reinforcement 80 is secured at a cross bearer member 81 which extends transversely over the vehicle from one side wall to the other, serves as support for the seating bench 61 and extends beyond the upper limit 82 of the seat bench 61. This projecting part 83 of the cross bearer 81 is bent in a spirally shaped manner against the boundary 82 of the seat bench 61 and forms an abutment for the latter. The lip portion 79 of the separating wall 66 is matched to the contour of the part 83 and includes at the end thereof an essentially U-shaped reinforcement 84 which surrounds the end of the part 83 and thereby retains the lip portion 79 in the position thereof.

Similarly, the separating wall 66 is provided within the area of the pressed roof part 64 or of the bearer 71 with a reinforcing insert 85 which is embedded at least partly within the foamed portion 77. The free rim portion 86 of the insert 85 is angularly bent in a U-shaped manner and in the built-in condition crimped over the welding flange 87 of the pressed parts 64 and 70. The flange portion 87 and the rim portion 86 serve for the reception of a seal 88 within which the rear window 69 is supported.

A wire mesh 89 extends between the reinforcements 80 and 85 of the wall 66 which wire mesh 89 is embedded into the foamed portion 77 and secured at the reinforcements. As a result thereof, the form-rigidity as well as the loading capacity of the wall is increased.

The arrangement of a wall in accordance with the present invention between the luggage and passenger space of a passenger motor vehicle which is driven by an air-cooled internal combustion engine disposed below the luggage space brings with it a good shielding of the passenger space against engine noises. This is based, inter alia, on the advantageous absorption capacity of the porous foamed laminate the density of which may be selectively determined in a known manner during manufacture thereof. As a result thereof, there exists a possibility, depending on ultimate use, to manufacture a suitable foamed part for certain walls or wall parts which satisfy the requirements therefor. A motor vehicle provided with wall parts made in accordance with the present invention thereby also considerably reduces the danger of accident in case of collision.

Accordingly, the present invention is not limited to the embodiments illustrated herein as it is susceptible of many modifications and changes within the spirit thereof. Especially, the constructive configuration of the parts and/or the connections thereof is of no significance insofar as the present invention is concerned.

Thus, it is quite obvious that the present invention is not limited to the details shown and described herein but is susceptible of many changes and modifications within the spirit and scope thereof, and I, therefore, do not wish to be limited to the details shown and described herein but intend to cover all such changes and modifications as are encompassed by the scope of the appended claims.

I claim:

1. A vehicle body for motor vehicles having form-rigid bearer parts, especially passenger vehicles, comprising wall means formed by foam laminates and having inner and outer surfaces, a metal framework disposed in said wall means in a position in which said metal framework is spaced inwardly of said inner and outer surfaces, said form-rigid bearer parts being foamed into said wall means at least partially during manufacture and comprising sheet-metal means projecting into rim portions of said wall means intermediate said surfaces, said metal framework comprising a plurality of elements having end portions extending in the directions of their lengths toward said sheet-metal means and terminating in the vicinity of said sheet-metal means.

2. A vehicle body for motor vehicles according to claim 1, wherein said bearer parts are provided with apertures within the foamed-in area, said apertures being filled by said foamed laminates.

3. A vehicle body for motor vehicles according to claim 1, wherein said framework is a wide-mesh wire network, said elements being comprised by wires of said network, said sheet-metal means comprising wall portions, said end portions of said elements extending through said wall portions.

4. A vehicle body for motor vehicles according to claim 1, wherein said wall means comprises a roof member, one of sair rim portions being constituted by the foremost transverse portion of said roof member, said sheet-metal means including a sheet-metal member partially bounding said transverse portion, and means for detachably securing said roof member to an adjacent body part comprising a clamping member secured to said sheet-metal member and operably engageable with said adjacent body part.

5. A vehicle body for motor vehicles according to claim 1, wherein said end portions intersect and are anchored to said projecting sheet-metal means.

6. A vehicle body for motor vehicles according to claim 1, wherein said wall means includes roof means, said vehicle body being provided with a door aperture, girder means extending transversely of the vehicle body to the vicinity of said door apertures, said girder means conforming to the configuration and curvature of said roof means, said girder means being disposed within said roof means in a postion in which said girder means is in supporting contact with said metal framework and is spaced inwardly from said inner and outer surfaces.

7. A vehicle body according to claim 1, wherein said wall means comprises roof means, and wherein said rim portions include laterally disposed rim portions of said roof means, said laterally disposed rim portions being provided with rain channel means, said sheet-metal means including portions thereof reinforcing said rain channel means.

8. A vehicle body according to claim 7, wherein said sheet-metal means in the area of said laterally disposed rim portions are of undulated shape.

9. A vehicle body according to claim 1, wherein said wall means comprise roof means and wherein said rim portions include laterally disposed rim portions of said roof means, said last-named rim portions being terminated by terminal surface means, said sheet-metal means projecting through said terminal surface means.

References Cited in the file of this patent

UNITED STATES PATENTS

| | | |
|---|---|---|
| 1,498,234 | Childs | June 17, 1924 |
| 2,111,326 | Norris | Mar. 15, 1938 |
| 2,356,624 | Schulz et al. | Aug. 22, 1944 |
| 2,438,185 | Prance | Mar. 23, 1948 |
| 2,459,766 | Black | Jan. 18, 1949 |
| 2,556,062 | Buehrig | June 5, 1951 |
| 2,596,309 | Urich | May 13, 1952 |
| 2,612,964 | Hobbs | Oct. 7, 1952 |
| 2,653,139 | Sterling | Sept. 22, 1953 |
| 2,693,922 | Ellison et al. | Nov. 9, 1954 |
| 2,728,702 | Simon et al. | Dec. 27, 1955 |
| 2,744,042 | Pace | May 1, 1956 |
| 2,793,971 | Collins et al. | May 28, 1957 |
| 2,823,951 | Stahl | Feb. 18, 1958 |
| 3,003,810 | Kloote et al. | Oct. 10, 1961 |

FOREIGN PATENTS

| | | |
|---|---|---|
| 725,102 | Germany | Sept. 14, 1942 |
| 285,743 | Great Britain | Feb. 23, 1928 |